United States Patent [19]

Schlueter et al.

[11] 4,229,931
[45] Oct. 28, 1980

[54] HYDRAULIC HEIGHT SENSING SYSTEM WITH CYLINDER BY-PASS

[75] Inventors: Francis E. Schlueter, Des Moines; Russell D. Copley, Ankeny; Leon F. Sanderson, Des Moines, all of Iowa

[73] Assignee: Deere & Company, Moline, Ill.

[21] Appl. No.: 17,219

[22] Filed: Mar. 5, 1979

Related U.S. Application Data

[62] Division of Ser. No. 811,961, Jun. 30, 1977, abandoned.

[51] Int. Cl.³ .................... A01D 75/14; A01D 45/00
[52] U.S. Cl. ...................................... 56/10.2; 56/208; 56/DIG. 15
[58] Field of Search ............... 56/10.2, DIG. 15, 11.9, 56/208

[56]  References Cited
U.S. PATENT DOCUMENTS

| 2,913,878 | 11/1959 | Rue | 56/DIG. 15 |
|---|---|---|---|
| 3,417,553 | 12/1968 | Hubbard | 56/11.9 |
| 3,509,701 | 5/1970 | Clarke | 56/208 |
| 3,566,587 | 3/1971 | Janssen | 56/208 |
| 3,568,420 | 3/1971 | Hofer et al. | 56/208 |
| 3,643,407 | 2/1972 | Hubbard et al. | 56/10.2 |
| 3,714,767 | 2/1973 | Hubbard et al. | 56/208 |
| 3,953,959 | 5/1976 | Decruyenaere | 56/208 |

FOREIGN PATENT DOCUMENTS

| 1236805 | 3/1967 | Fed. Rep. of Germany | 91/401 |
|---|---|---|---|
| 1289212 | 2/1962 | France | 91/401 |
| 1438489 | 6/1976 | United Kingdom | 91/402 |

Primary Examiner—Paul J. Hirsch

[57]  ABSTRACT

An agricultural harvesting machine having a plurality of independently supported row crop harvesting units is provided with a hydraulically operated vertical positioning mechanism for adjusting the height of the units in accordance with ground surface variations. Each unit is provided with a ground-engaging feeler mechanically coupled to a control valve which adjustably varies the hydraulic fluid flow to a single acting unit lift cylinder. The cylinder includes fluid bypass capabilities to permit continued hydraulic fluid flow upon full extension of the cylinder piston and thereby avoid a fluid system pressure and consequent temperature increase.

4 Claims, 4 Drawing Figures

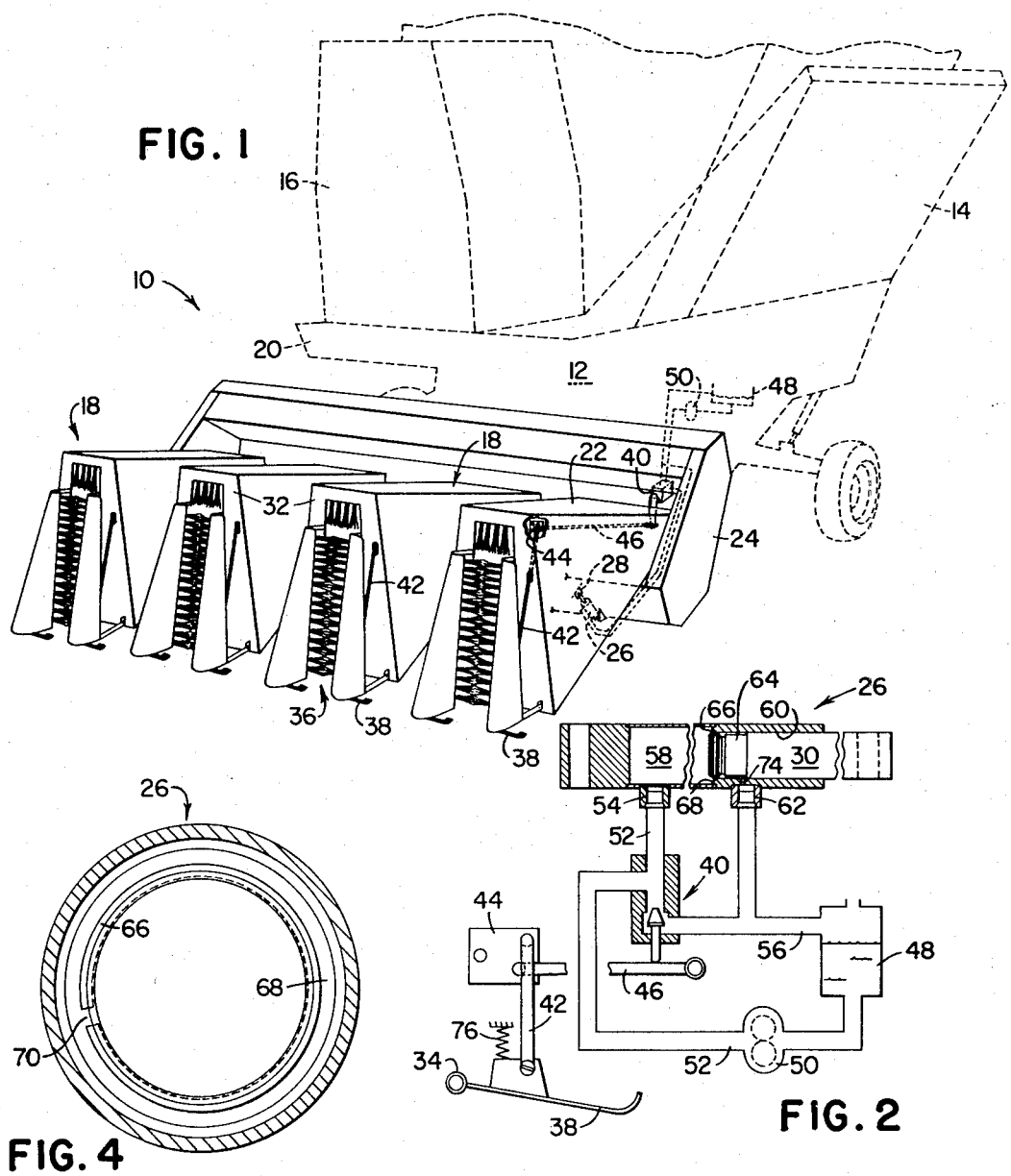
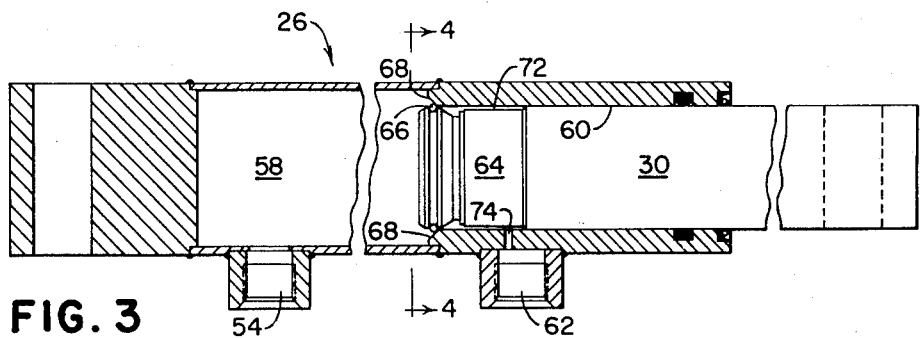

HYDRAULIC HEIGHT SENSING SYSTEM WITH CYLINDER BY-PASS

This is a division of application Ser. No. 811,961, now abandoned June 30, 1977.

BACKGROUND OF THE INVENTION

The present invention relates generally to agricultural harvesting implements and more particularly relates to ground sensing mechanisms utilized on row crop harvesting units to raise and lower the unit in accordance with variations in the ground surface over which the units are traveling.

It has heretofore been known to employ hydraulic height sensing systems for raising and lowering cantilevered row harvesting units, see for example U.S. Pat. No. 3,417,553 to A. L. Hubbard, U.S. Pat. No. 3,643,407 to Hubbard et al and U.S. Pat. No. 3,714,767 to Hubbard et al. Typically these sensing mechanisms employ a ground-engaging shoe or feeler supported on the harvesting unit and mechanically coupled with a control valve which continuously and adjustably varies the flow of hydraulic fluid to a hydraulic lift cylinder for raising and lowering the harvesting unit in accordance with variations in the ground surface over which the harvesting unit travels.

Agricultural harvesters commonly utilizing such a height sensing mechanism typically have two or more row crop harvesting units supported on the harvester frame in cantilevered fashion. Each harvesting unit is provided with its own ground-engaging shoe, lift cylinder and hydraulic control valve for adjustably varying the height of the row crop unit. It has further been typical to provide a common hydraulic fluid system for both the steering and height sensing functions on cotton harvesters such as cotton strippers or cotton pickers.

The hydraulic system employed on such harvesters has been an open center system due to the limited number of hydraulic functions required on such a harvester. Accordingly, both the steering and height sensing functions were provided by a single pump and a flow divider was utilized between the two systems to assure adequate steering and height sensing hydraulic flow capabilities. Until recently, cotton pickers and cotton stripper harvesters were provided with no more than two row crop harvesting units. However four row unit harvesters have recently been introduced. With the introduction of these harvesters a parallel hydraulic arrangement was required whereby each individual row unit could be vertically adjusted in accordance with its particular ground surface variation. Accordingly, a second flow divider was introduced into the height sensing hydraulic system to assure the proper hydraulic flow to each unit's lift cylinder.

The recent introduction of these four unit harvesters requiring individual sensing capacities has presented a problem not incurred with two unit harvesters of the past. In the southwest United States, cotton is often planted in adjacent rows with the third row being skipped to provide better irrigation and productivity. To harvest such fields with a four row harvester, one unit was raised to its full up position. This required that one lift cylinder be extended for an extended period of time. Since an open center hydraulic system is utilized, the hydraulic line pressure would increase and the relief valve provided to protect the hydraulic system would open returning the fluid to the reservoir. Because the pressure at which the relief valve opened was significantly higher than the operating pressure required to assure adequate pressure reserve for the steering system, the relief valve would not open until the line pressure had risen sufficiently to increase significantly the fluid temperature. Consequently, the elevation of the row unit for just a short period of time caused the hydraulic fluid temperature to be increased enough to cause the pump rings and pump to fail, thereby resulting in the loss of the height sensing system as well as the steering system for the harvester.

Further complicating the conversion to a four row header unit and the utilization of an open center height sensing unit mechanism was an additional problem. As a particular row unit was elevated during harvesting of skip-row cotton or as a result of some foreign object jamming the height sensing ground-engaging shoe the corresponding pressure increase would result in a slight jump in the other three parallel lift cylinders even though the flow dividers assured a relatively constant flow. This resulted in less efficient harvesting of the cotton.

SUMMARY OF THE INVENTION

Accordingly, it would be desirable to provide a height sensing system in combination with an open center hydraulic system which would permit continued hydraulic flow in the system to avoid the significant fluid pressure and temperature build up during elevation of individual row unit harvesters in skip-row cotton harvesting operations.

More specifically it would be desirable to eliminate the need for the hydraulic system pressure to build to excess levels before continued flow can be provided through the system. Accordingly, it would be desirable to eliminate the need for a pressure relief valve while retaining the reserve pressure capacity to assure positive steering under adverse conditions.

It is therefore an object of the present invention to provide a hydraulic height sensing system wherein fluid flow through the system can be maintained while line pressure is increased as necessary to extend the lift cylinder and elevate a row unit. More specifically, it is an object to provide a bypass flow through the hydraulic lift cylinder upon full extension of the cylinder's piston.

Further it is an object to eliminate hydraulic fluid temperature increases by reducing the pressure increases incurred in the operation of the height sensing mechanism.

It is also an object of the present invention to eliminate the loss of steering associated with the failure of the hydraulic fluid pump when fluid temperature increases occur.

BRIEF DESCRIPTION OF THE DRAWINGS

FIG. 1 illustrates the improved height sensing system in combination with a four row unit cotton stripper.

FIG. 2. is a schematic illustration of the height sensing system.

FIG. 3 is a side sectional view of the single acting hydraulic cylinder having fluid bypass capability.

FIG. 4 is a view taken along lines 4—4 of FIG. 3.

DESCRIPTION OF THE PREFERRED EMBODIMENT

The height sensing or automatic height control device is provided in combination with a cotton stripper. However, it should be understood that other types of harvesters, such as cotton pickers could advantageously utilize the present invention, and there is no intention to limit its use to a cotton stripper.

Referring now to the drawings and particularly FIG. 1, it will be seen that the cotton harvester 10 has a main tractor portion 12 supporting a basket 14 on its rearwardly end, an operators station 16 on the forwardly end and projecting in cantilevered fashion forwardly of the tractor 12, four row harvesting units 18. The harvesting units 18 are suspended on the tractor main frame 20 at their respective rearward end 22 for rocking movement about a horizontally transverse axis. A transport lift means (not shown) is provided between the header 24 supporting the four row crop harvester units 18 and the frame 20 to raise all four units 18 during transport.

Means for rocking each individual unit 18 about its respective transverse axis is provided in the form of a hydraulic lift cylinder 26 mounted between that unit 18 and the frame 20. Each cylinder 26 is pivotally anchored at its base end to the header 24 and at its ram end to a bracket 28 or similar structure on the unit 18 such that extension of the cylinder piston 30 causes the forward or gathering end 32 of the harvesting unit 18 to rise. Obviously, retraction of the piston 30 will cause the forward end of the unit 18 to lower.

Pivotally connected at 34 to move vertically on the bottom of each respective unit 18 adjacent its gatherer opening 36 is a shoe or ground feeler 38. Each ground-engaging feeler 38 is coupled by a mechanical linkage to a control valve 40 mounted on the tractor 12. As is apparent from FIG. 1, the linkage includes a first generally vertical link or rod 42 coupled with the feeler 38 rearwardly of its pivotal connection 34 to the unit 18, a bell crank 44 pivotally carried by the unit 18, and a second rod or link 46 coupled with the frame 20. As is illustrated in FIG. 2, vertical movement of a feeler 38 will cause its valve 40 to adjustably vary fluid flow between the cylinder 26 and hydraulic fluid reservoir 48. As the feeler 38 is elevated, the valve 40 will close and the hydraulic fluid pressure in the open center system hydraulic system utilized in this preferred embodiment will increase, causing the lift cylinder piston 30 to extend and the unit 18 to be rockably raised.

Looking now to FIG. 2, which schematically illustrates the improved height sensing system, it will be seen that the system includes a hydraulic fluid reservoir or supply 48 mounted on the frame 20, a fixed displacement pump 50 for providing a fixed flow in the supply line 52, a feeler activated valve 40 for adjustably directing fluid flow between the hydraulic cylinder inlet passage 54 and the return line 56, a single acting cylinder 26 having first and second chambers designated 58 and 60 respectively, the first chamber 58 larger in diameter than the second chamber 60, and a fluid outlet passage 62 in the cylinder 26 coupled with a return line 56. While not specifically illustrated, separate and parallel supply lines lead from the pump 50 to each unit's respective control valve 40 and hydraulic cylinder 26 and separate return lines 56 connect each respective hydraulic cylinder 26 to the reservoir 48. Since the general operation of each control valve 40 in response to movement of its respective feeler 38 is similar for each unit 18, only one unit's operation need be specifically discussed.

Each control valve 40 is of the type which can adjustably vary the flow of fluid between its respective hydraulic cylinder 26 and the return line 56. Accordingly, as the valve 40 closes, the flow to the reservoir 48 will be restricted, and in the open center system, supply line pressure will build to the cylinder 26 to extend the piston 30. Because flow dividers are utilized to divide the flow from the pump 50 upstream of the respective unit valves 40, no pressure increase should be recognized at the other lift cylinders 26 as one valve 40 closes in response to a ground surface change.

As a valve 40 is closed, fluid will be directed to the first chamber 58 of the cylinder 26 and the fluid pressure will increase causing the piston 30 to extend and raise the unit 18. Upon further extension of the piston 30, the reduced diameter end portion 64 will move axially to the right, as viewed in FIG. 3, of the outlet passage or port 62. Upon complete extension of the piston 30, the stop ring 66 of the piston will abut the abutment surface 68 between the cylinder first and second chamber 58 and 60. While the piston 30 will no longer move, the fluid will be able to flow through the bypass formed by the opening 70 in the stop ring 66, see FIG. 4, and the axially-extending groove or reduced piston diameter and through the restrictor 74 in the outlet passage 62 and to the reservoir 48.

With this bypass capability, the pressure change realized as the valve 40 blocks flow to the reservoir 48 will be only to that degree required to extend the piston 30 fully, and no relief valve will be required in the system. Temperative increases of the fluid will be less significant as pressures are increased to extend the cylinders 30, and pump ring failure caused by high fluid temperatures will be reduced.

In operation, the height sensing system functions as follows:

Assuming that an operator is entering a field with the harvesting units 18 in their transport position. The units 18 and the header 24 will be lowered from their transport position for operation. As the units 18 are lowered, their respective ground-engaging feelers 38 will contact the ground and the mechanical linkage will accordingly adjust the control valve 40 to adjust the fluid flow through that respective valve 40.

With the restriction in flow to the reservoir 48, pressure will increase in the flow to the cylinder 26 and the piston 30 will be extended to rockably adjust the unit 18 about its horizontal axis. Conversely, the compression spring 76 preloading the feeler 38 will cause it to lower when the unit 18 passes over lower ground surfaces and the valve 40 to increase the flow to the reservoir 48 so as to permit the piston 30 to retract.

If the operator elects to pick skip-row cotton or otherwise desires to not use one unit 18 of the four, he simply causes that unit's lift cylinder 26 to be continuously and fully extended. With the bypass, no fluid temperature increase will threaten the pump 50 or its rings, nor will a relief valve be required in the line.

We claim:

1. A harvester having a main mobile frame, a harvesting unit having a forward end and a rearward end and carried on the frame for rocking movement about a transverse horizontal axis, and an improved unit height control means for rockably raising and lowering the forward end of said unit in accordance with ground surface variations including: a hydraulic fluid supply supported by the frame; a fluid supply line connected with the supply; a ground-engaging feeler mounted on the unit for vertical movement in response to ground surface variations; a hydraulic cylinder supported between the frame and unit and connected with the supply line; means in the supply line between the supply and hydraulic cylinder for creating a flow therein; a first fluid return line connected with the supply; a second fluid return line between the supply and hydraulic cylinder; a valve control mechanism connected to the first return line and the supply line and coupled with the feeler so as to be responsive to vertical movement of the feeler to adjustably vary fluid flow to the supply and hydraulic cylinder; and fluid bypass means in the hydraulic cylinder to permit fluid flow from the supply line, through the cylinder and to the second return line when the hydraulic cylinder is extended.

2. A harvester having a main mobile frame, a pair of harvesting units carried on the frame for rocking movement about horizontal transverse axes, each unit having a forward end and a rearward end and an improved height sensing means carried by the frame for rockably raising and lowering the forward ends of the units in response to ground surface variations beneath said units including: a hydraulic fluid supply carried by the frame; a fluid supply line connected with the supply; a hydraulic cylinder supported between each unit and the frame; cylinder fluid supply lines connected to the supply line and connecting the hydraulic cylinders in parallel; a fluid pump for creating a fluid flow in the supply line; first fluid return lines connecting the hydraulic cylinder with the supply; a second fluid return line; a ground-engaging feeler mounted on each unit for vertical movement in response to variations in ground surface over which the unit passes; a control valve mechanism between each cylinder supply line and the second return line, the mechanism connected to the respective feeler or its respective unit and responsive to vertical movement thereof to adjustably vary fluid flow to the hydraulic cylinder and return line; and bypass means located within each said cylinder in communication with each cylinder supply line and its respective first return line for permitting fluid flow between said lines when the cylinder piston is shifted.

3. A harvester including a main mobile frame, a harvesting unit having a forward end and a rearward end and mounted on the frame for rocking movement about a transverse horizontal axis, and an improved unit height sensing means for rockably raising and lowering the forward end of the unit in accordance with ground surface variations including: a hydraulic fluid supply carried by the frame; a fluid supply line coupled with the supply; pump means for creating a fluid flow in the supply line; a ground-engaging member mounted on the unit for vertical movement in response to vertical variations of the ground surface traveled over by the unit; a first fluid return line coupled with the supply; a second fluid return line coupled with the supply; a hydraulic cylinder housing supported between the unit and frame; first and second longitudinally extending and adjoining chambers in the housing, the second chamber having a diameter smaller than the first chamber; a fluid inlet passage in communication with the first chamber, and connected to the supply line; a fluid outlet passage in communication with the second chamber, and connected to the second fluid return line; a piston reciprocable in said chambers between a first retracted position whereat it extends into both chambers and a second extended position whereat it is axially shifted from the first position, yet extends into both chambers; limiting means acting between the piston and housing to restrict axial movement of the piston; and fluid passage means between the piston and second chamber to permit fluid passage from the first chamber, through the second chamber and out the outlet passage; a control valve mechanism coupled with the supply line, the inlet passage and first return line and responsive to vertical movement of the ground-engaging member to adjustably vary the fluid flow to the first chamber and supply.

4. In a cotton harvester having a plurality of transversely spaced cotton harvesting units supported at their rear ends to shift vertically on supporting structures, and hydraulic motors extending between the supporting structures and units with each motor having a cylinder and piston for raising and lowering the units on the supporting structures, the improvement residing in a hydraulic circuit operating each of said hydraulic motors comprising: a fluid reservoir, a pressure source receiving fluid from the reservoir and having a fluid passage in communication with the head end of said cylinder; a return passage between the reservoir and cylinder and having an inlet opening into said cylinder at the rod end thereof and located so the piston closes said inlet except at the extreme end of its extension stroke; a valve in the aforesaid fluid passage to said cylinder and having an outlet for returning fluid to said reservoir, said valve having a movable valve member for selectively balancing the movement of fluid from said pressure source into the cylinder and through the outlet to the reservoir; a ground-engaging member mounted on at least one of said harvesting units for relative free vertical movement; means connecting said ground-engaging member to said valve member for adjusting the latter in accordance with the vertical spacing between the ground surface and the respective unit; and a flow restrictor in said return passage for limiting the rate of discharge of fluid moving from the cylinder to the reservoir.

* * * * *